Sept. 9, 1952  R. C. WHELCHEL  2,609,927
COMMUTATOR TESTING AND SORTING DEVICE
Filed April 17, 1948  14 Sheets-Sheet 1

INVENTOR.
Rupert C. Whelchel
BY
Spencer Hardman & Fehr
his attorneys

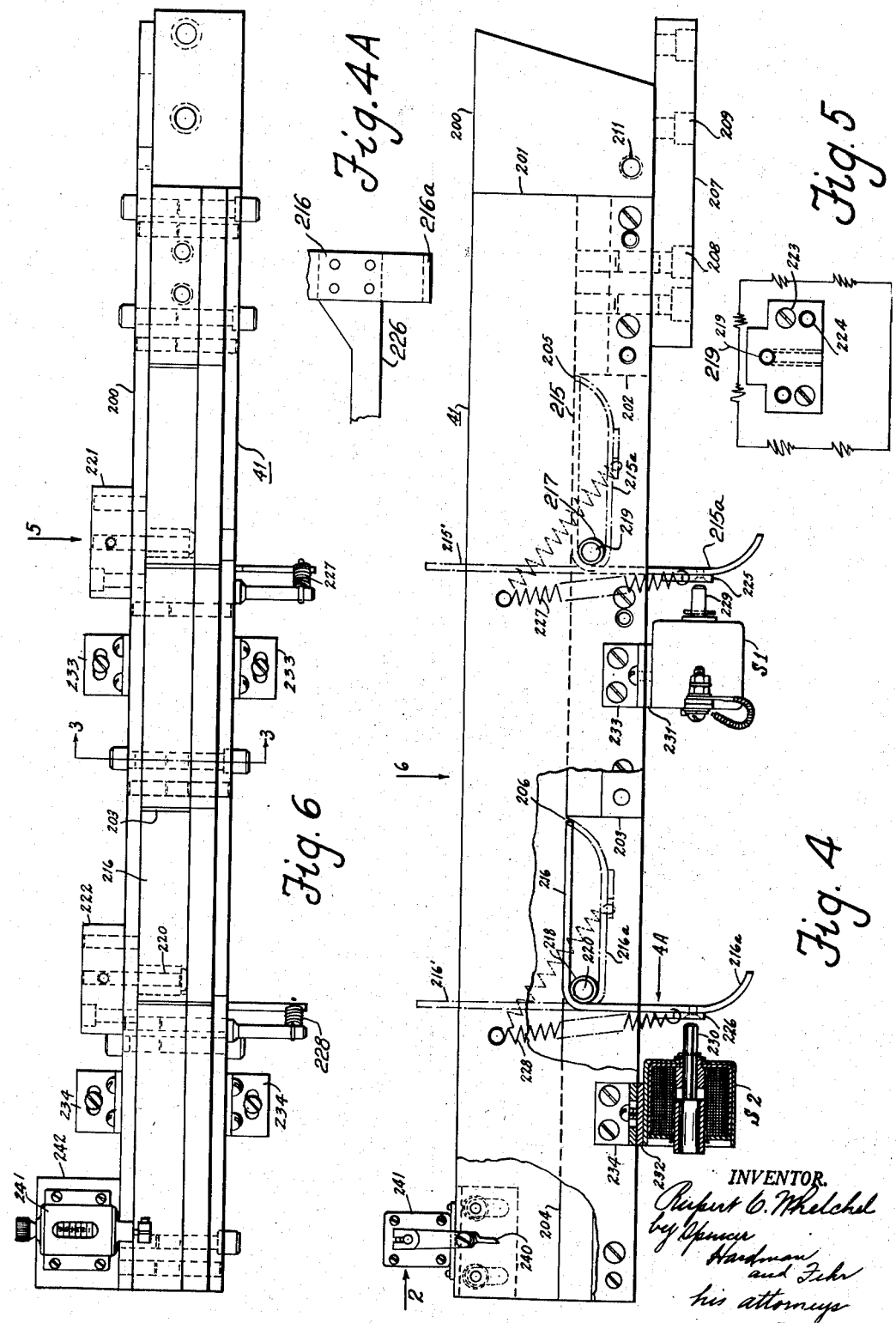

Sept. 9, 1952 R. C. WHELCHEL 2,609,927
COMMUTATOR TESTING AND SORTING DEVICE
Filed April 17, 1948 14 Sheets-Sheet 3
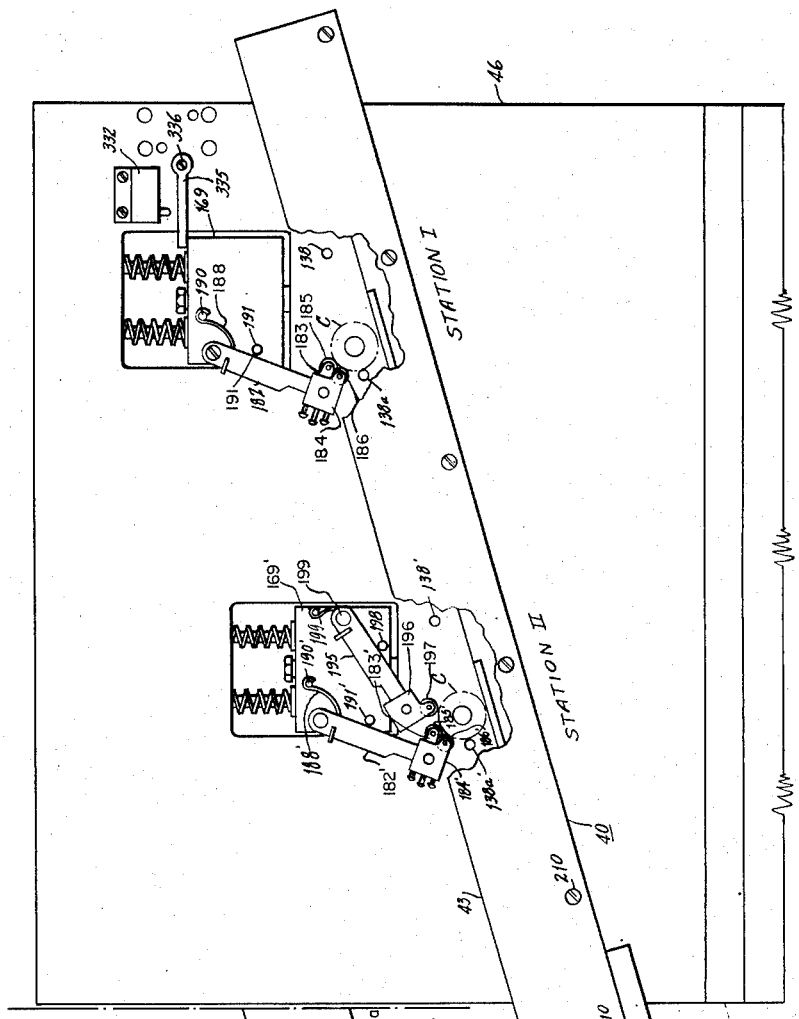
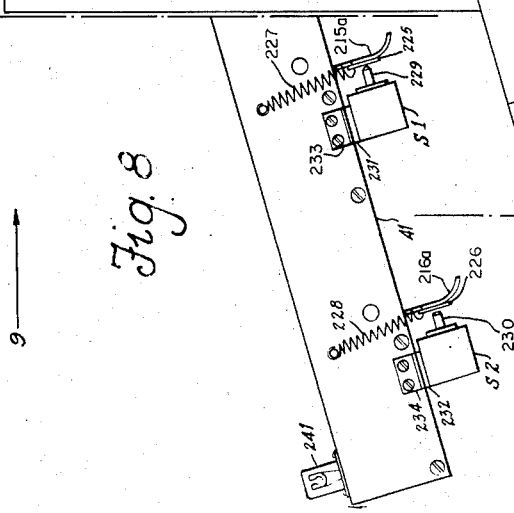
INVENTOR.
Rupert C. Whelchel
BY
Spencer Hardman & Fehr
his attorneys Sept. 9, 1952            R. C. WHELCHEL            2,609,927

COMMUTATOR TESTING AND SORTING DEVICE

Filed April 17, 1948            14 Sheets-Sheet 4

INVENTOR.
Rupert C. Whelchel
BY
Spencer Hardman & Fehr
his attorneys

Sept. 9, 1952   R. C. WHELCHEL   2,609,927
COMMUTATOR TESTING AND SORTING DEVICE
Filed April 17, 1948   14 Sheets-Sheet 5

INVENTOR.
Rupert C. Whelchel
BY Spencer Hardman & Fehr
his attorneys

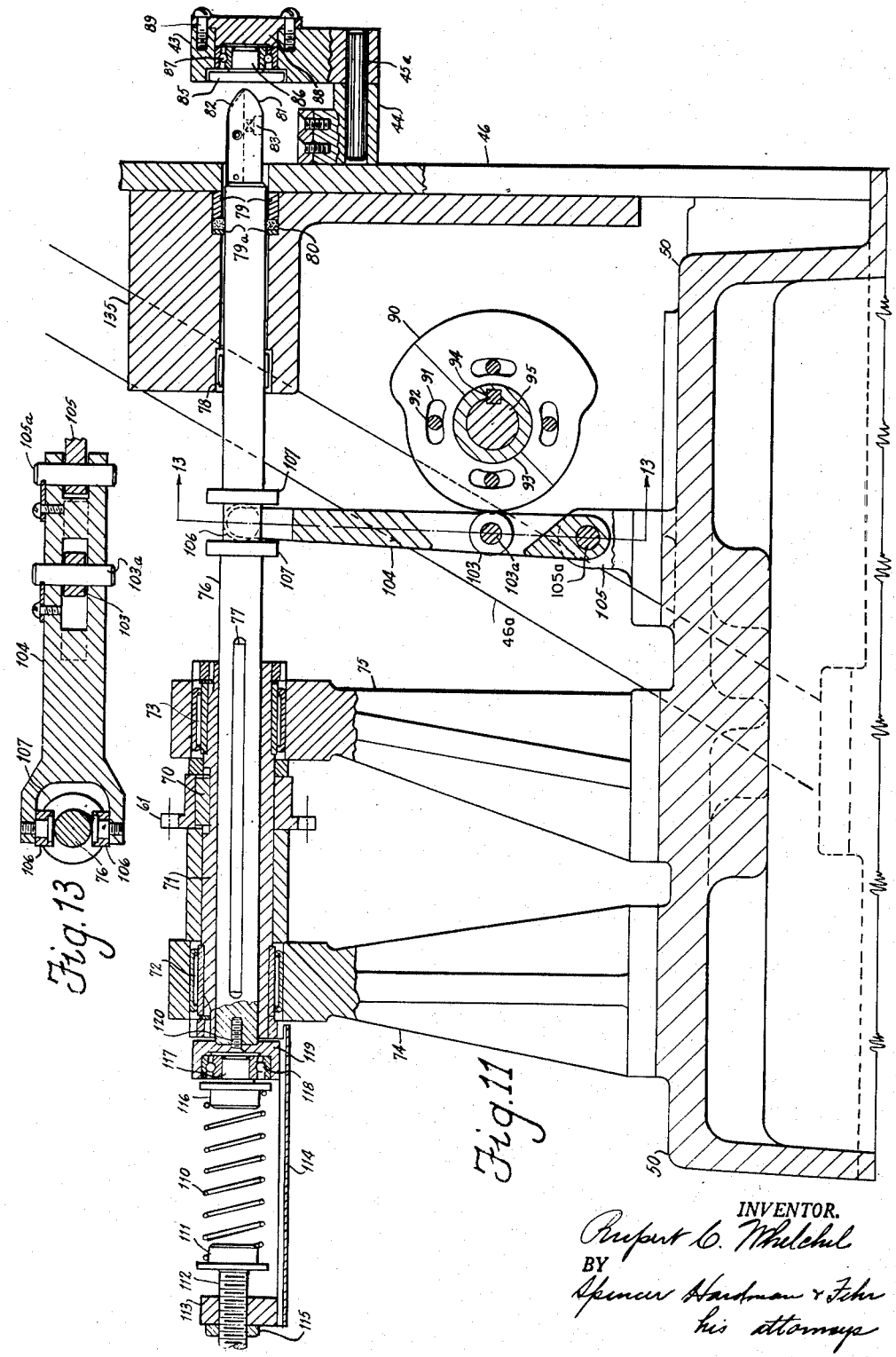

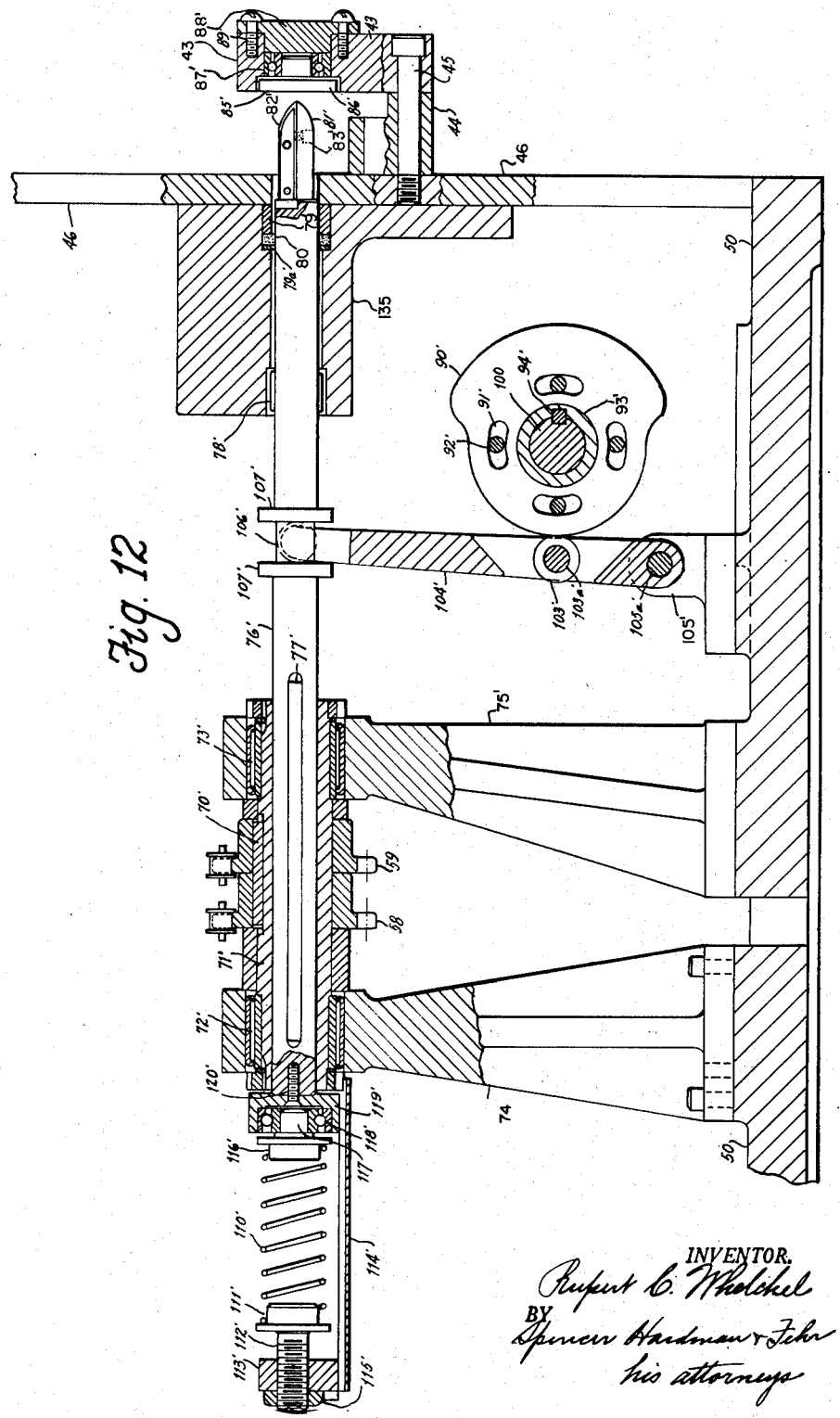

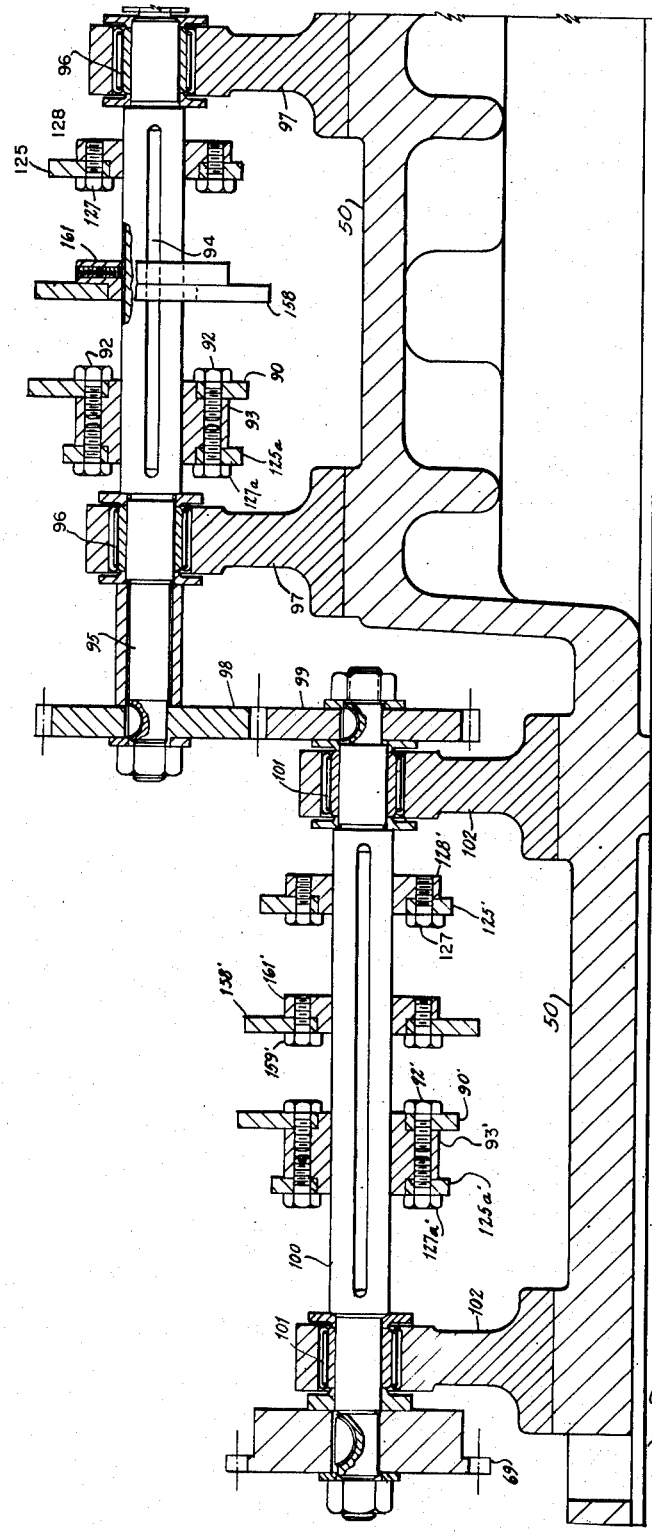

Sept. 9, 1952 R. C. WHELCHEL 2,609,927
COMMUTATOR TESTING AND SORTING DEVICE
Filed April 17, 1948 14 Sheets-Sheet 9

INVENTOR.
Rupert C. Whelchel
BY Spencer Hardman & Fehr
his attorneys

Sept. 9, 1952 R. C. WHELCHEL 2,609,927
COMMUTATOR TESTING AND SORTING DEVICE
Filed April 17, 1948 14 Sheets-Sheet 10
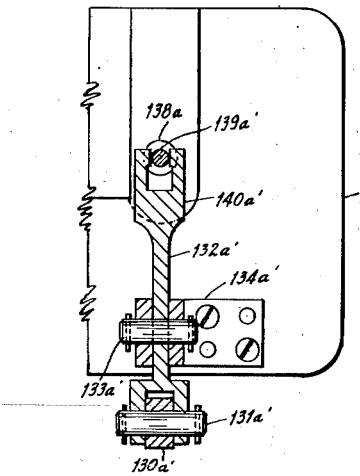
Fig. 22
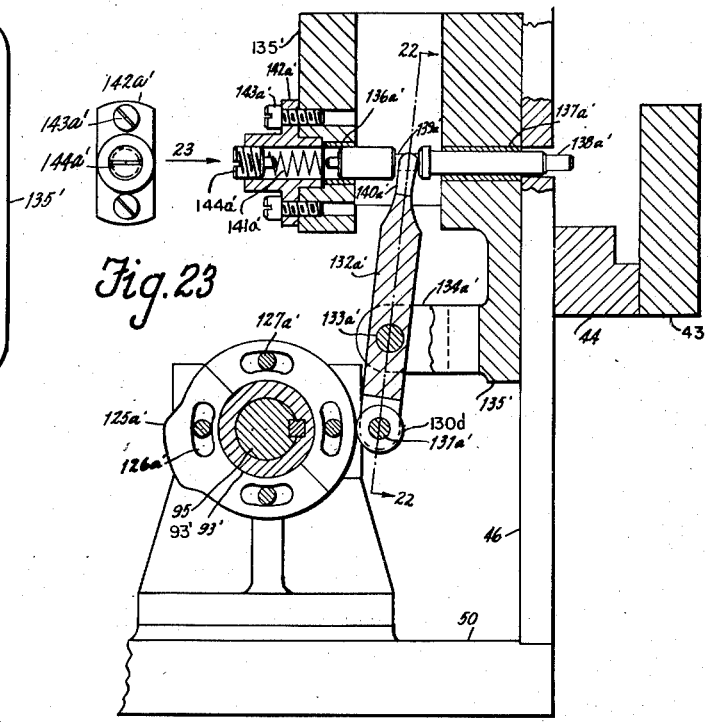
Fig. 23
Fig. 21
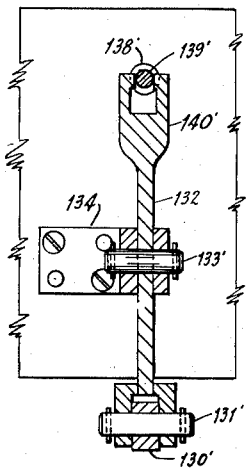
Fig. 20
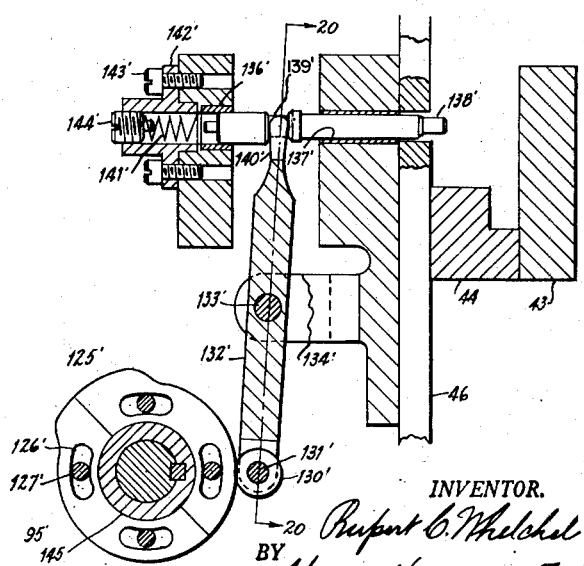
Fig. 19
INVENTOR.
Rupert C. Whelchel
BY Spencer Hardman & Fehr
his attorney Sept. 9, 1952 — R. C. WHELCHEL — 2,609,927
COMMUTATOR TESTING AND SORTING DEVICE
Filed April 17, 1948 — 14 Sheets-Sheet 11
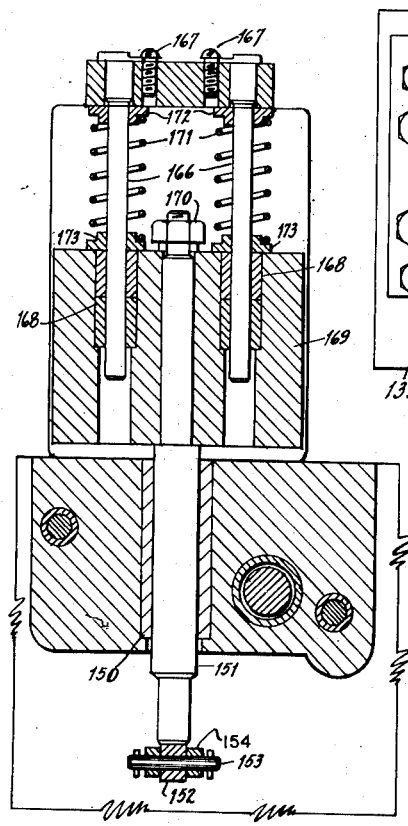
Fig. 27
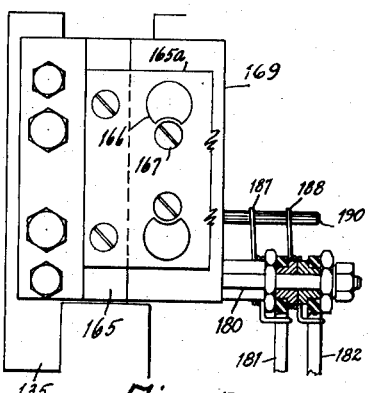
Fig. 26
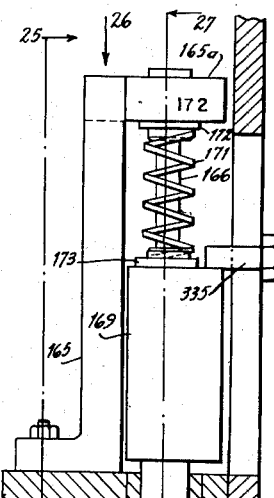
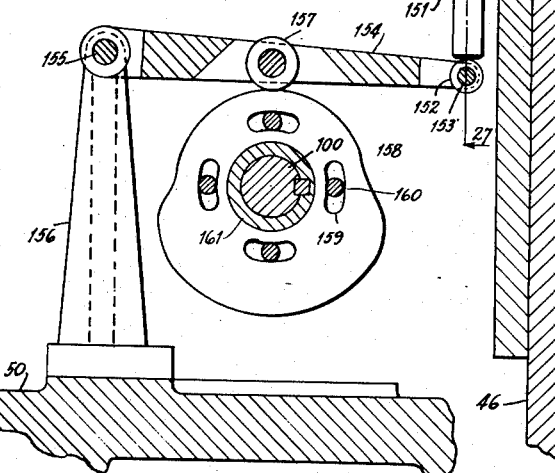
Fig. 24
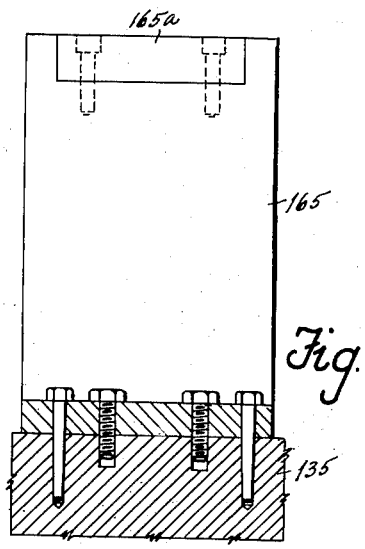
Fig. 25
INVENTOR.
Rupert C. Whelchel
BY Spencer Hardman & Fehr
his attorneys Sept. 9, 1952 R. C. WHELCHEL 2,609,927
COMMUTATOR TESTING AND SORTING DEVICE
Filed April 17, 1948 14 Sheets-Sheet 12
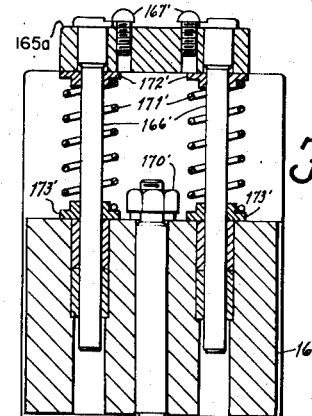
Fig.30
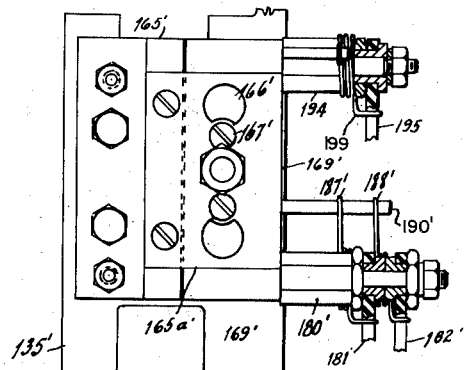
Fig.31
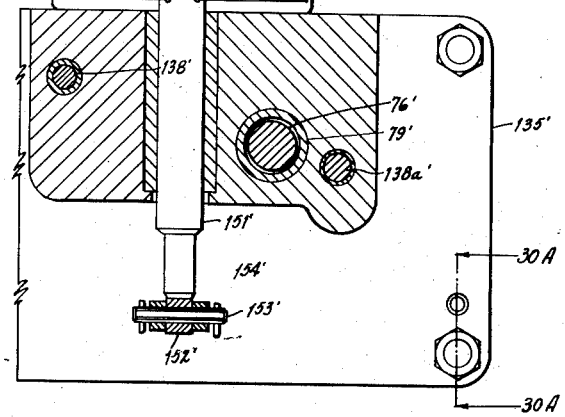
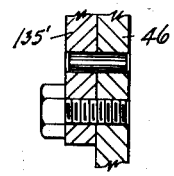
Fig.30A
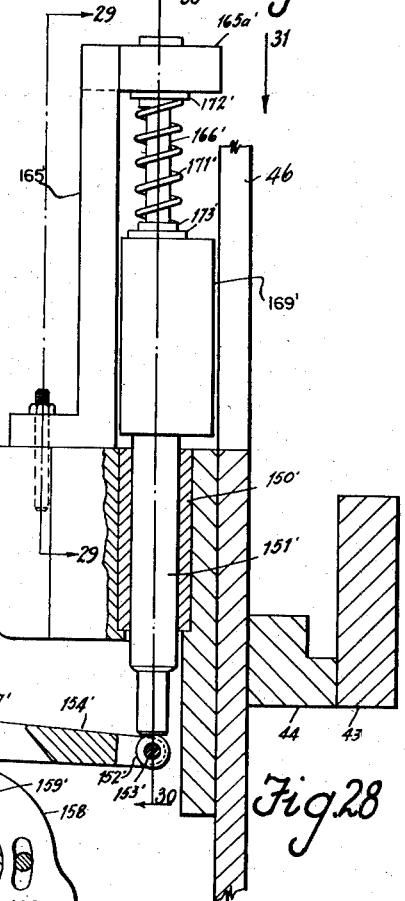
Fig.28
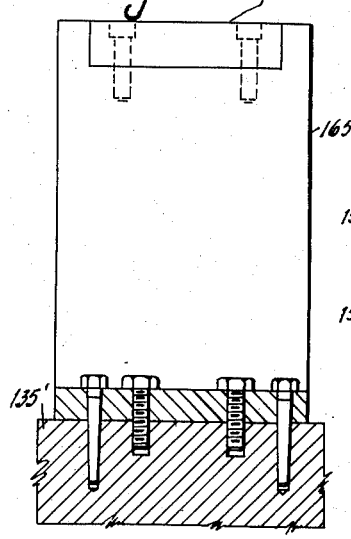
Fig.29
INVENTOR.
Rupert C. Whelchel
BY Spencer Hardman & Feher
his attorneys Sept. 9, 1952  R. C. WHELCHEL  2,609,927
COMMUTATOR TESTING AND SORTING DEVICE
Filed April 17, 1948  14 Sheets-Sheet 13

INVENTOR.
Rupert C. Whelchel
BY Spencer Hardman & Fehr
his attorneys

Sept. 9, 1952  R. C. WHELCHEL  2,609,927
COMMUTATOR TESTING AND SORTING DEVICE
Filed April 17, 1948  14 Sheets-Sheet 14
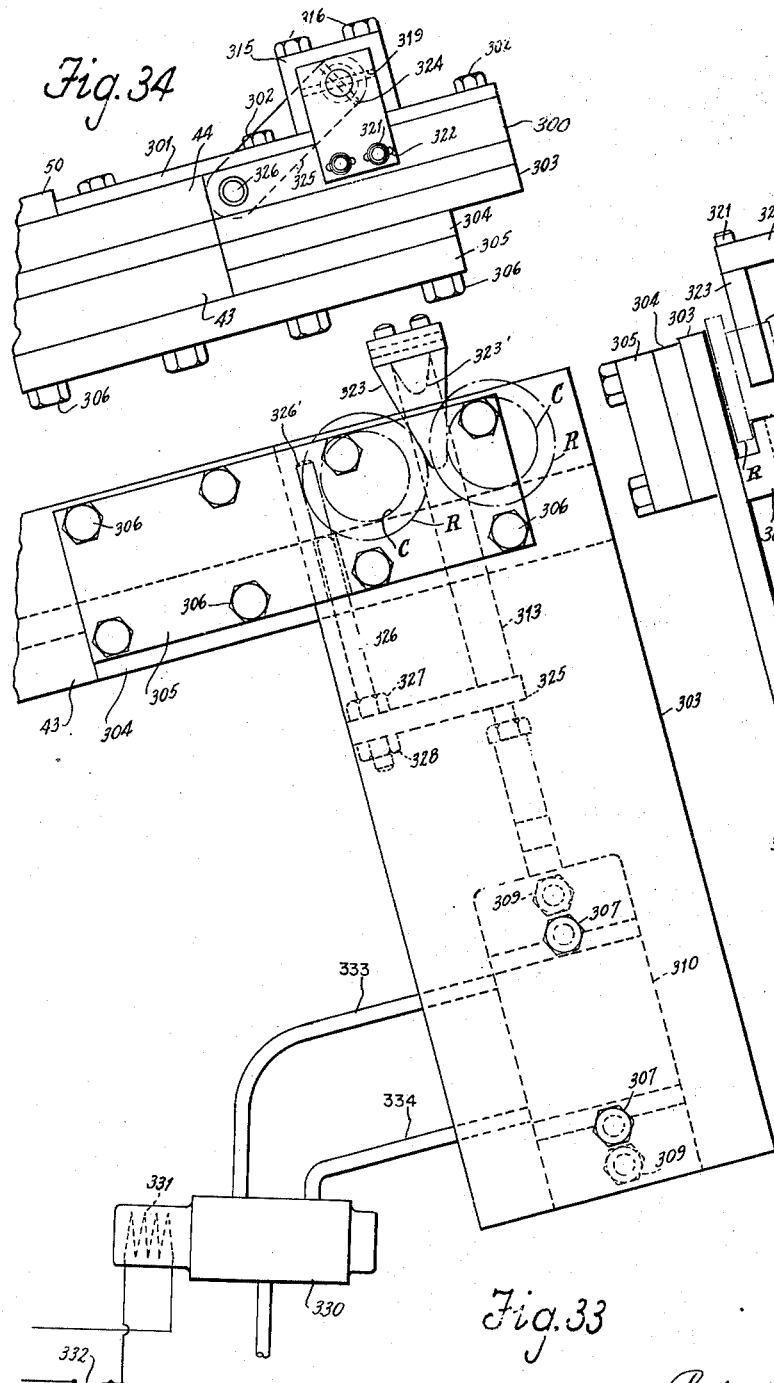
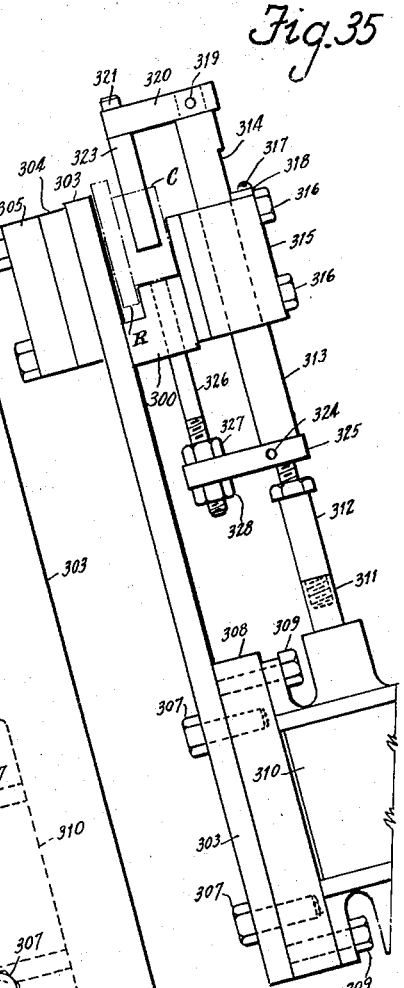
INVENTOR.
Rupert C. Whelchel
BY Spencer Hardman & Fehr
his attorneys.

Patented Sept. 9, 1952

2,609,927

UNITED STATES PATENT OFFICE 2,609,927

COMMUTATOR TESTING AND SORTING DEVICE

Rupert C. Whelchel, Anderson, Ind., assignor to General Motors Corporation, Detroit, Mich., a corporation of Delaware Application April 17, 1948, Serial No. 21,730

6 Claims. (Cl. 209—81)

This invention relates to the manufacture of commutators used with direct current to dynamo-electric machines and its object is to provide apparatus for detecting a short circuit between any adjacent commutator bars and between any bar and core of the commutator. The apparatus provides a chute along which the commutators pass to a first station where the commutator stops and is rotated and current is applied for the purpose of burning off metal particles clinging between adjacent bars in order that such particles would not interfere with a true test of permanent short circuit. At the second station to which the commutator passes, it is stopped and rotated while current is applied to it to test for shorts or grounds. If there is a short between bars, a trap is automatically sprung to divert the commutator into a bin for receiving shorted commutators. If there is a ground between a bar and the core, another trap is automatically sprung which diverts the commutator into a bin for receiving grounded commutators. Good commutators pass from the lower end of the chute into a bin.

Further objects and advantages of the present invention will be apparent from the following description, reference being had to the accompanying drawings, wherein a preferred embodiment of the present invention is clearly shown.

In the drawings:

Fig. 4 is a side view of a portion of the track on which the commutators roll after having been inspected.

Fig. 4A is a view in the direction of arrow 4A of Fig. 4.

Fig. 5 is a fragmentary view in the direction of arrow 5 of Fig. 6.

Fig. 6 is a view in the direction of the arrow 6 of Fig. 4.

Figs. 7 and 8, taken together, constitute a front elevation of the inspecting machine.

Figure 9:
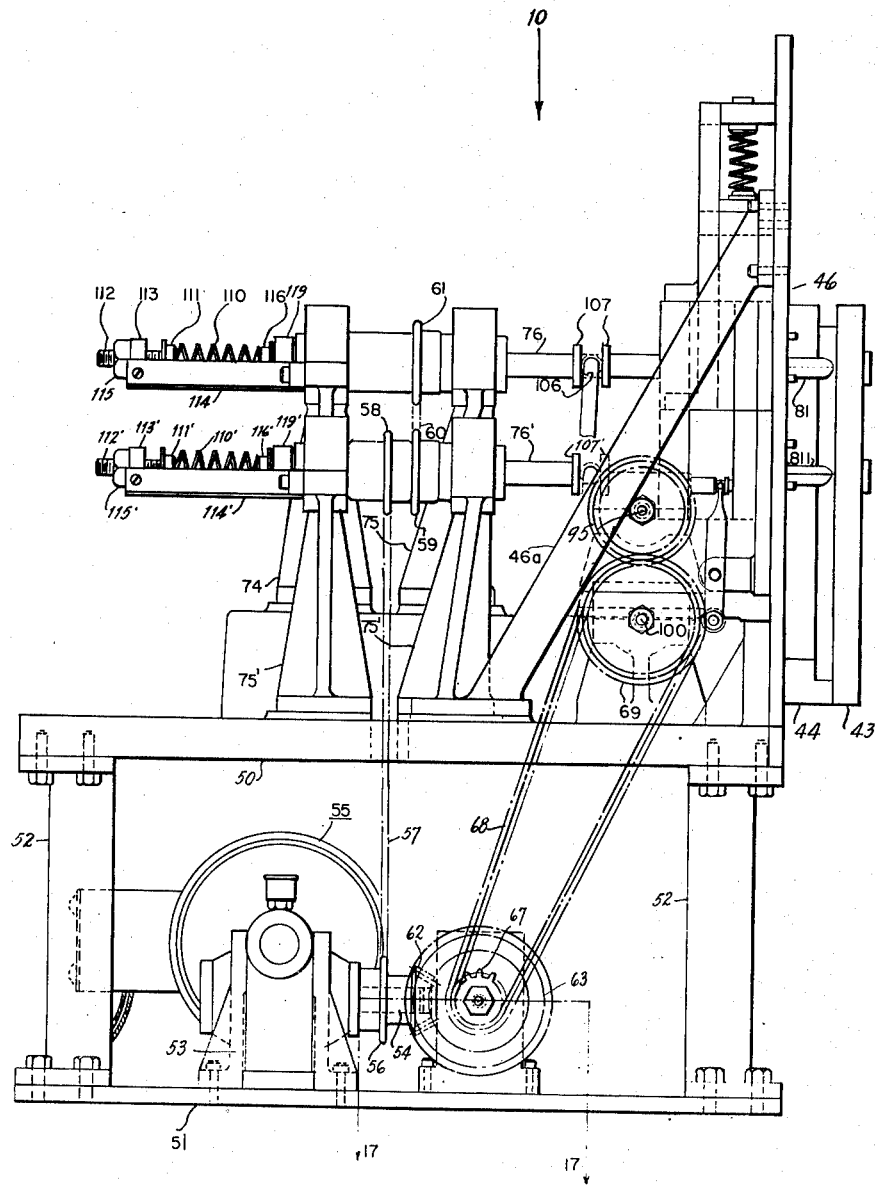

Fig. 9 is a view in the direction of arrow 9 of Figs. 7 and 8.

Figure 10:
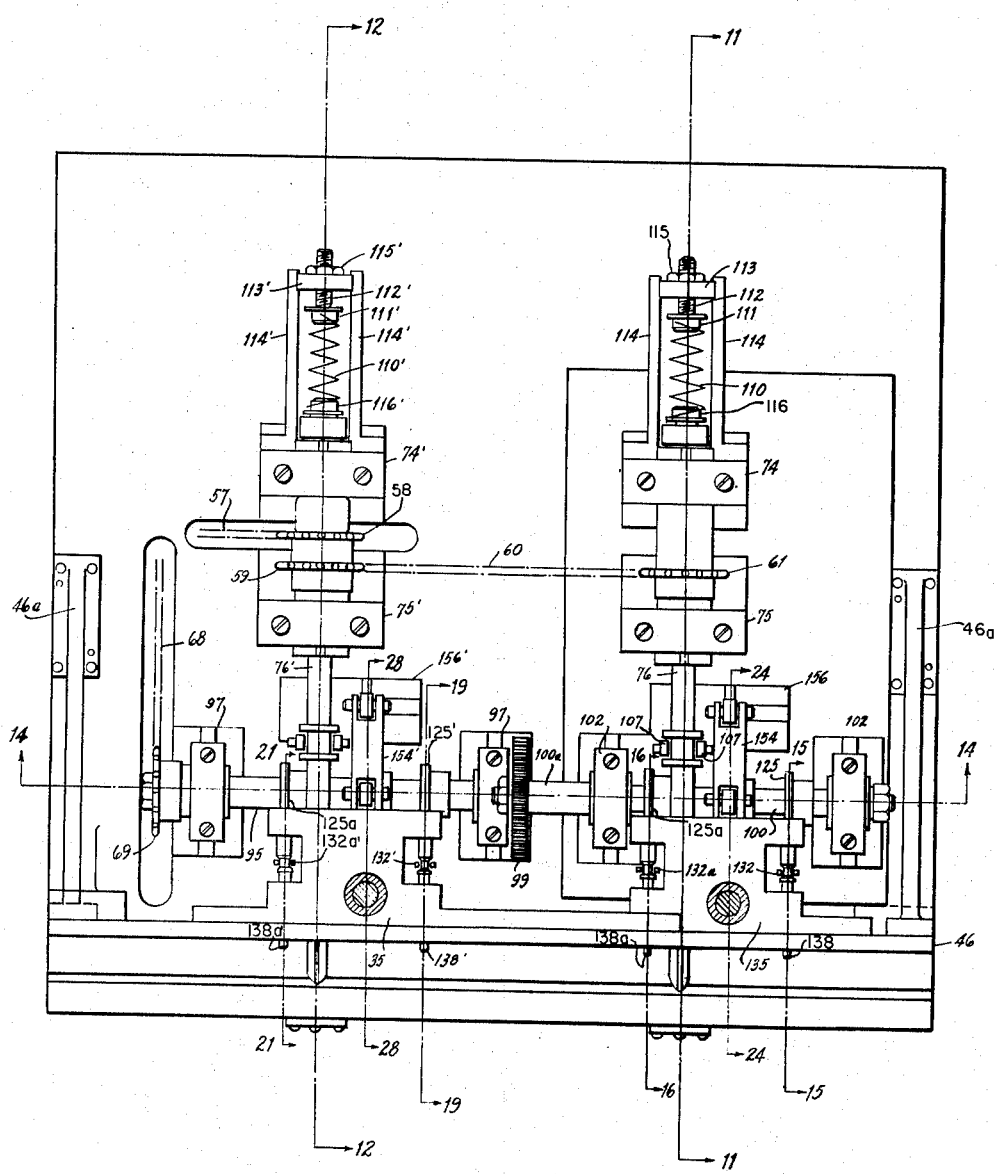

Fig. 10 is a view in the direction of arrow 10 of Fig. 9.

Figs. 11 and 12 are sectional views on lines 11—11 and 12—12 of Fig. 10 and are drawn to a larger scale.

Fig. 13 is a sectional view on line 13—13 of Fig. 11.

Figures 15, 16:
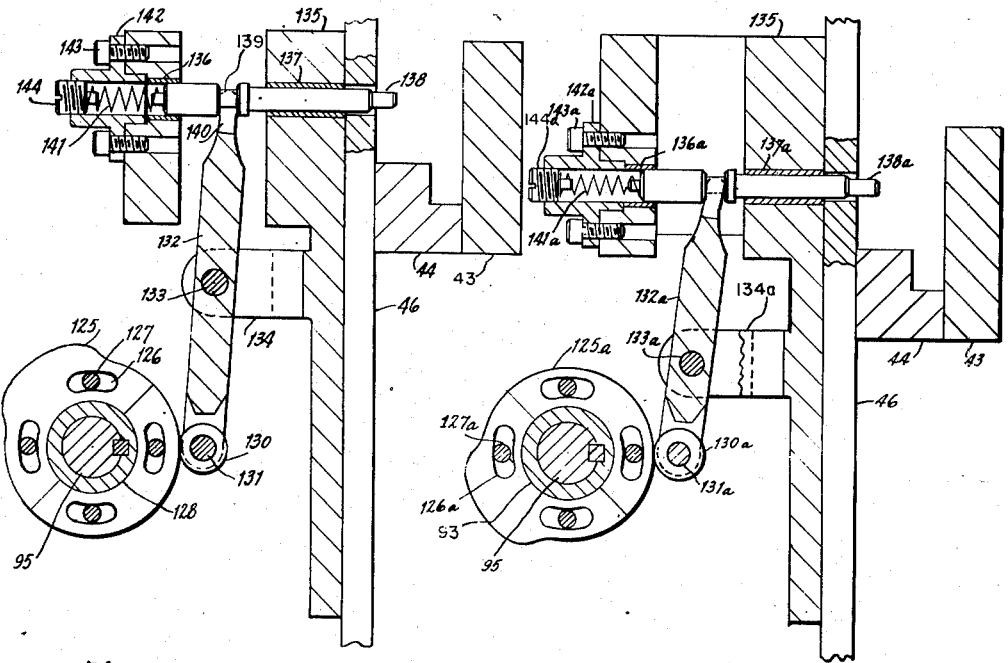

Figs. 14 and 15 are sectional views, respectively, on lines 14—14 and 15—15 of Fig. 10 and are drawn to a larger scale.

Fig. 16 is a sectional view on line 16—16 of Fig. 10 and are drawn to a larger scale.

Figures 17, 18:
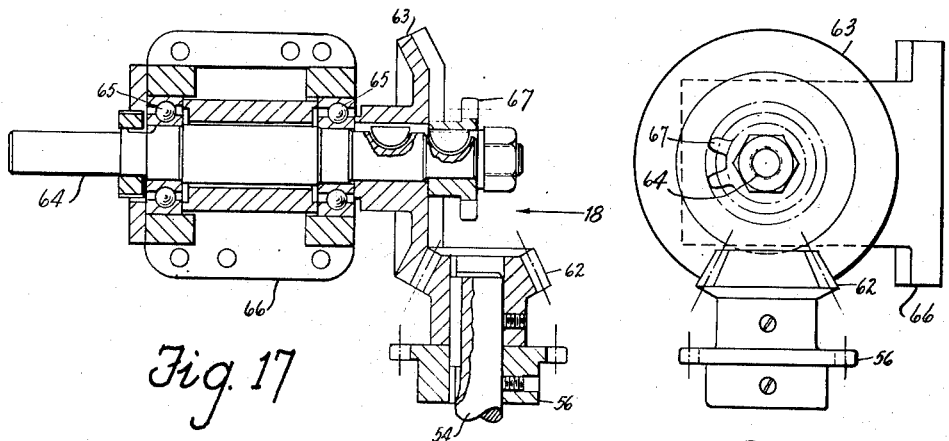

Fig. 17 is a sectional view on line 17—17 of Fig. 9 and are drawn to a larger scale.

Fig. 18 is a view in the direction of arrow 18 of Fig. 17.

Fig. 19 is an enlarged sectional view taken on line 19—19 of Fig. 10.

Fig. 20 is a sectional view on line 20—20 of Fig. 19.

Fig. 21 is an enlarged sectional view on line 21—21 of Fig. 10.

Fig. 22 is a sectional view on line 22—22 of Fig. 21.

Fig. 23 is a view in the direction of arrow 23 of Fig. 21.

Fig. 24 is an enlarged sectional view on line 24—24 of Fig. 10.

Figs. 25 and 27 are sectional views respectively on lines 25—25 and 27—27 of Fig. 24.

Fig. 26 is a view in the direction of arrow 26 of Fig. 24.

Fig. 28 is an enlarged sectional view and taken on line 28—28 of Fig. 10.

Figs. 29 and 30 are sectional views respectively on lines 29—29 and 30—30 of Fig. 28.

Fig. 30A is a sectional view on line 30A—30A of Fig. 30.

Fig. 31 is a view in the direction of arrow 31 of Fig. 28.

Figure 32:
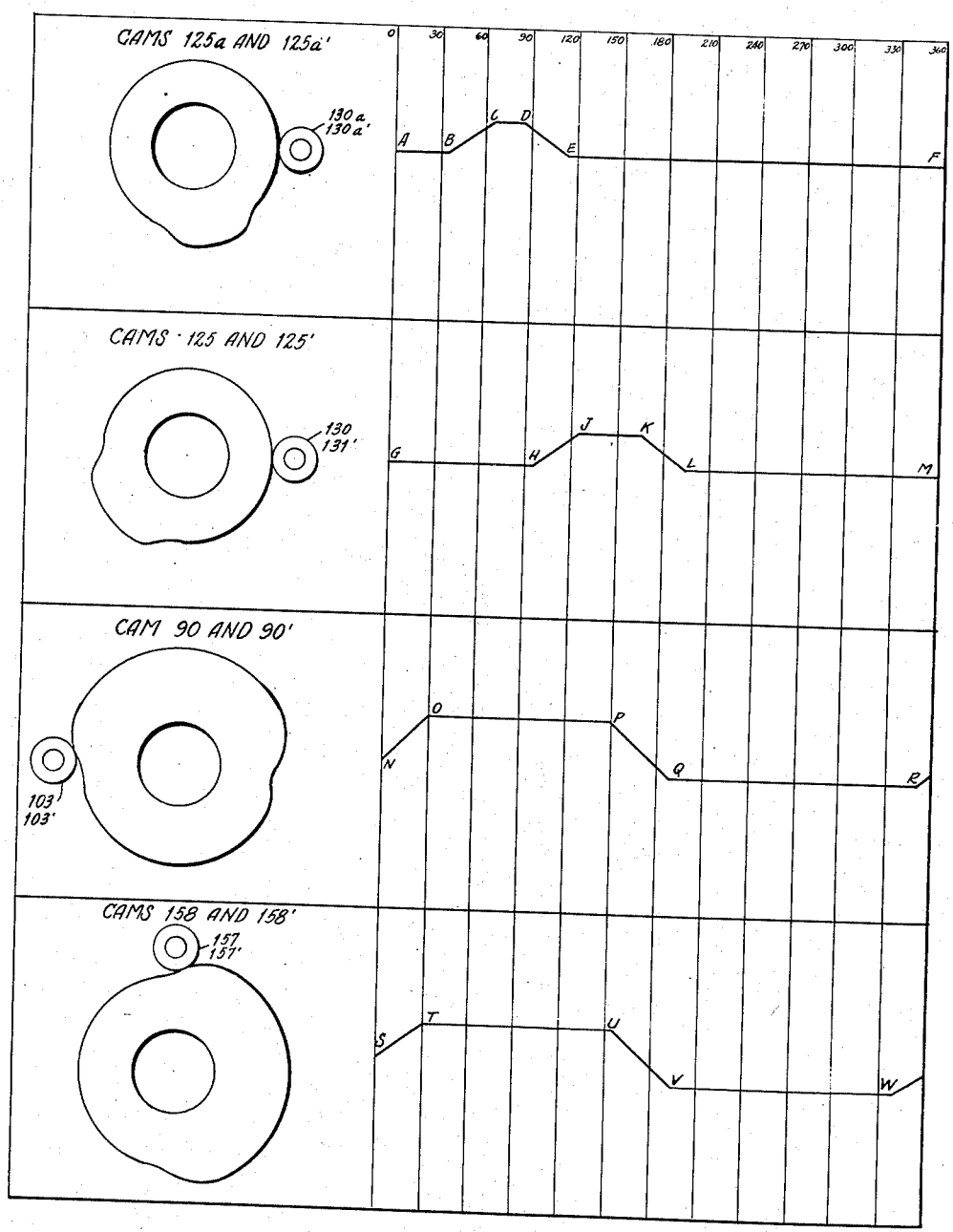

Fig. 32 is a cam chart.

Figs. 33, 34 and 35 are front, top and side views respectively of an attachment for feeding commutators having riser bars.

Referring to Figs. 7 and 8, the track down which the commutators C roll is made in two sections 40 and 41. Track section 40 comprises bars 43 and 44 which screws 45 and dowels 45a connect to a vertical plate 46 (Figs. 11 and 12). Plate 46 is attached as shown in Fig. 12 to a base 50, which as shown in Fig. 9, is supported above a plate 51 by posts 52. Plate 51 may rest upon the floor or may be supported above it in any suitable manner, not shown. Braces 46a are attached to table 50 and plate 46.

Base 51 supports the housing 53 of a speed reducing mechanism which is connected with an electric motor 55. The output shaft 54 of the speed reducer is connected with a sprocket 56 connected by a chain 57 with a sprocket 58 (Figs. 9 and 10). Sprocket 58 is connected with a sprocket 59 connected by a chain 60 with a sprocket 61.

Shaft 54 is connected with a bevel gear 62 meshing with a bevel gear 63 attached to a shaft 64 journaled in bearing 65 supported by a bracket 66 supported by the base 50 (Figs. 17 and 18). Shaft 64 drives a sprocket 67 connected by a chain 68 (Fig. 9) with a sprocket 69 (Fig. 10).

Referring to Fig. 11, the sprocket 61 is connected by a key 70 with a tubular shaft 71 journaled in roller bearings 72 and 73 supported by brackets 74 and 75 respectively attached to the base 50. Shaft 71 has a longitudinal spline connection with a shaft 76 by a key 77. Shaft 76 is journaled also in a bearing 78 supported by a bracket 135 attached to plate 46 and shaft 76 extends through a seal ring 80 retained by metal rings 79 and 79a. Shaft 76 carries a fixed plug portion 81 and a movable plug portion 82 which is urged away from plug portion 81 by a spring 83. The plug portions enter the core of a commutator and press it against a disc 85 integral with a short shaft 86 journaled in a roller bearing 87 which is retained by a plate 88 which screws 89 attach to the bar 43.

The shaft 76 is moved axially from the commutator engaging position shown in Fig. 11 by a cam 90 provided with slots 91 through which screws 92 pass for clamping the cam 90 to a hub 93 which a key 94 attaches to a cam shaft 95. As shown in Figs. 10 and 14, shaft 95 is journaled in roller bearings 96, supported by brackets 97 mounted on base 50. Shaft 95 is driven by a gear 98, meshing with a gear 99 driven by a shaft 100 driven by sprocket 69. Shaft 100 is mounted in bearings 101 supported by brackets 102 mounted on base 50, Fig. 14.

Referring to Fig. 11, cam 90 is engaged by a roller 103 pivotally supported by a pin 103a (Fig. 13) carried by a lever 104 which is pivotally supported by a pin 105a attached to a bracket 105 mounted on base 50. The forked upper end of the lever 104 supports rollers 106 which are received between flanges 107 provided by shaft 76. Shaft 76 is urged to the right by a spring 110, the left end of which engages a retainer 111 integral with a screw 112 threaded through a plate 113 which is attached to brackets 114 (Fig. 10) which are attached to the bracket 74. A nut 115 locks the screw 112 in the desired position of adjustment. The right end of spring 110 is received by a retainer 116 having a stem 117 received by the inner race of a ball bearing 118 whose outer race is retained by a cup 119 which a screw 120 attaches to the shaft 76. It is therefore apparent that the spring 110 urges the shaft 76 toward the right (Fig. 11) and the roller 103 into engagement with the cam 90.

The parts which are shown in Fig. 12 are substantially identical with those shown in Fig. 11, and the same reference numbers are applied to similar parts with primes affixed. Therefore no further description of Fig. 12 is required except to state that shaft 100 (not shaft 95) drives cam 90'.

Referring to Fig. 15, a cam 125 has slots 126 for receiving screws 127 for attaching the cam 125 to a cam hub 128 driven by shaft 95. Cam 125 engages a roller 130 supported by a pin 131 carried by a lever 132 supported by a pin 133 supported by a bracket 134 attached to bracket 135 attached to plate 46. Bracket 135 supports aligned bushings 136 and 137 which receive a rod 138 having a reduced part 139 for receiving the bifurcated upper end 140 of the lever 132. The rod 138 is urged right and the roller 130 is urged left by a spring 141 located within a retainer 142 which screws 143 fasten to the bracket 135. The spring 141 is confined between a screw plug 144 threaded into the retainer 142 and the left end of the rod 138. The construction shown in Fig. 16 is substantially the same as that shown in Fig. 15, therefore, similar parts are referred to by the same reference numbers with a affixed. Cam 125a is attached to the hub 93 which carries cam 90 (Fig. 14). Lever 132 is longer than lever 132a because the pin 138 is at a higher level relative to the base 50 than the pin 138a. Retraction of pin 138 to the left of plate 46 while pin 138a extends to the right of plate 46 allows a commutator to pass to the first test station. Advancing of pin 138 to the right of plate 46 holds back the commutators which are above the first station on the chute. While the pin 138 is so located, pin 138a is retracted to permit a commutator to descend to the second station. Pins 138' and 138a' are adjacent the second station for similar purposes. The mechanisms, shown respectively in Figs. 19, 20 and Figs. 21, 22, 23, for operating the pins 138' and 138a', are like the mechanisms shown in Figs. 15 and 16 and similar reference numerals are used with primes affixed. For example, cam 125' controls pin 138' (Fig. 19); and cam 125a' controls pin 138a' (Fig. 21). Cam 125' is attached to a hub 128' driven by shaft 100. Cam 125a' is attached to hub 93' which carries cam 90 and which is driven by shaft 100.

Referring to Figs. 24 through 27 the bracket 135 supports a guide bushing 150 which receives a rod 151, the lower end of which rests upon a roller 152 journaled on a pin 153 carried by a lever 154 pivoted at 155 on a bracket 156 supported by a base 50. Lever 154 pivotally supports a roller 157 engaging a cam 158 having slots 159 through the screws 160 for attaching the cam to a hub 161 (Fig. 14) which is keyed to the shaft 100. A bracket 165 is attached to the bracket 135 and supports a plate 165a which supports rods 166 (Fig. 24) which are retained by screws 167. The rods are guided by bushings 168 in a block 169 through which the rod 151 passes, said block being retained by a nut 170 threaded on the rod. Springs 171, which are confined by retainers 172 and 173 bearing respectively against the plate 165a and the block 169, urge the rod 151 downwardly and the roller 157 into engagement with the cam 158.

Block 169 (Fig. 24) carries a stud 180 which pivotally supports non-conducting arms 181 and 182 (Fig. 26) which respectively support metal brackets 183 and 184 pivotally supporting metal contact rollers 185 and 186 (Fig. 7) respectively for engaging adjacent bars of the commutator C. The brackets 183 and 184 are connected into the electrical circuit shown in Fig. 1. Springs 187 and 188 which engage the arms 181 and 182 respectively and a stud 190 attached to the block 169 urge the rollers against the commutator when the block 169 is lowered or against a stop pin 191 when the block is raised.

The mechanism (Figs. 28-31) for operating block 169' at the second station (Fig. 7) is similar to the mechanism for operating block 169 and like parts are referred to by the same reference numbers with primes affixed. Cam 158' is attached to a hub 161' driven by shaft 100 (Fig. 14). Block 169' (Fig. 31) supports similar non-conducting arms 181' and 182' supporting rollers 185' and 186' respectively supported by brackets 183' and 184' respectively which are connected into the electrical circuit. Block 169' carries another stud 194 supporting a non-conducting arm 195 supporting a metal bracket 196 carrying a contact roller 197. When the block 169' is lowered as shown in Fig. 7, rollers 185', 186' and 197 engage the commutator. When the block 169' is lifted, the arms 181' and 182' engage a stop pin 191' and the arm 195 engages a stop pin 198.

Referring to Figs. 4 to 6, the track section 41 comprises side plates 200 and 201 and bottom plates 202, 203 and 204 which are spaced to provide openings 205 and 206. A splice plate 207 secured by screws 208 to plate 202 and by screws 209 to plate 44 unites the track sections. The lower one of the screws 210 which secure the plate 43 to plate 44 of section 40 is threaded through a hole 211 in plate 200.

The openings 205 and 206 are normally closed by trap doors 215 and 216 respectively which are attached to hubs 217 and 218 respectively pivotally supported by rods 219 and 220 respectively supported by blocks 221 and 222 respectively (Fig. 6), which are attached as shown in Fig. 5, to plate 200 by screws 223 and dowels 224. The traps 215 and 216 each have downwardly extending arms 215a and 216a supporting plates 225 and 226 attached respectively to springs 227 and 228 which respectively urge these plates clockwise toward the plungers 229 and 230 respectively of solenoids S1 and S2 attached to plates 231 and 232 which are supported by brackets 233 and 234 respectively attached to the plates 200 and 201. So long as these solenoids are deenergized, the openings 205 and 206 are closed by the traps 215 and 216.

In case of a short circuit of the commutator the solenoid S1 is energized and the rod 229 moves right thereby pushing against the bar 225 sufficiently to cause the center line of action of the spring 227 to be located to the right of axis of the rod 219 whereupon the trap 215 moves counterclockwise into the position 215' and its arm 215a moves into the position 215a'. The commutator rolls into the opening 205 and rests upon the arm 215a and the weight of the commutator causes the trap to return to normal position and the plunger of the solenoid also to return to normal position because the solenoid had been momentarily energized and becomes deenergized as soon as the commutator is released from the second station. The commutator descends to bin for receiving shorted commutators.

In case of a ground between any of the commutator bars and the commutator core, the solenoid S2 will be momentarily energized and the trap 216 will move to 216' and its arm 216a to 216a' and the commutator will be discharged into a bin for receiving grounded commutators.

If the commutator passes the short test and the ground test at the second station, the traps 215 and 216 remain in normal position and the commutator rolls from the lower end of the chute into a bin for receiving good commutators. Just before leaving the lower end of the chute section 41, the commutator engages an arm 240 of a counter 241 which is mounted on a bracket 242 attached to the plate 200.

Figure 1:
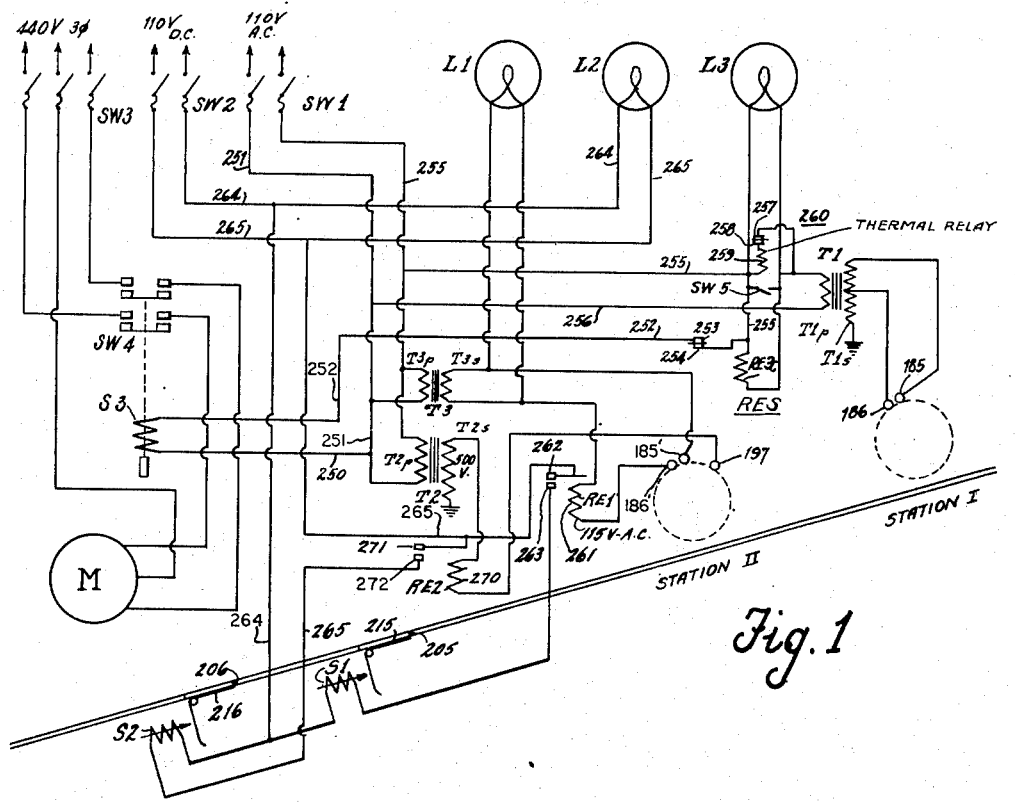
Fig. 1 is a wiring diagram of the electrical circuit of the inspection apparatus.
Figure 3:
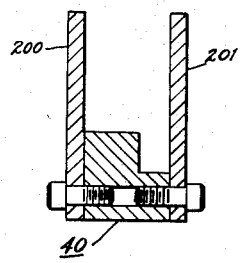
Fig. 3 is a sectional view on line 3—3 of Fig. 6.
Figure 2:
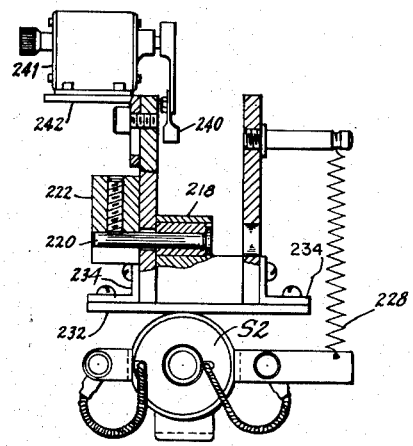
Fig. 2 is a view in the direction of arrow 2 of Fig. 4.

Referring to Fig. 1, the electric motor M becomes operative upon closing of switch SW3 connecting it with a three phase A. C. circuit and by closing a switch SW4 when a solenoid S3 is energized. Solenoid S3 is connected with wire 250 connected with wire 251 and is connected with wire 252 connected with a relay contact 253 engaging contact 254 of relay RE3 which is connected with wire 255. Wires 251 and 255 are connected by switch S1 with an alternating current source of 110 volts. At station 1 where rollers 185 and 186 engage the rotating commutator, 25 volts A. C. is applied in order to burn out any small particles of metal which might happen to lie against the mica insulators and cause minute short circuits between adjacent bars. The necessary current is obtained from the secondary T1s of transformer T1 whose primary T1p is connected by wire 256 with wire 251 and with a contact 257 normally engaging a contact 258 of a thermal cutout relay 260 having a coil 259 which is connected with wire 255. In case of an overload, the coil 259 will carry current sufficient to effect separation of the contacts 257 and 258. Relay 260 may be set to operate to open at 35 amps. thus protecting the transformer T1 in case an abnormal current is drawn from its secondary as the commutator revolves at station 1. The relay 260 is reset manually. The separation of contacts 257, 258 interrupts a normal short circuit around coil RE3c of relay RE3 which then seperates contacts 254, 253 and solenoid S3 is deenergized and the circuit to the motor M is disconnected and the motor stops. By closing switch SW5 for a brief time, the solenoid S3 is reenergized and motor M will turn the commutator away from a dead short position so that the thermal relay 260 can be reset.

At station 2 the commutator is rotated for the short and ground tests. For the short test current is applied to contact rollers 185' and 186' by the secondary T3s of a one to one ratio isolation transformer T3 whose primary T3p is connected with wires 251 and 255. Secondary T3s is in series with winding 261 of relay RE1 having contacts 262 and 263. In case of a short circuit between adjacent commutator bars, coil 261 will be energized and contact 262 will engage contact 263 thereby connecting solenoid S1 with lines 264 and 265, thereby causing the trap 215 to move counterclockwise thereby effecting ejection of the shorted commutator at opening 205 in the chute or track.

For the ground test transformer T2 is provided. Its primary T2p is connected with wires 251 and 255. One end of its secondary T2s is grounded and the other end is connected with roller 197. If, during rotation of the commutator at station 2 any bar is grounded to the core connected with the shaft 76' which is grounded, current at 500 volts will flow through winding 270 of relay RE2, thereby causing its contact 271 to engage contact 272 and solenoid S2 will be connected with wires 264 and 265. Trap 216 will then move counterclockwise to effect ejection of the grounded commutator through the opening 206 in the track or chute.

The commutators may cease rotation at the station at such angular position that the relays RE1 and RE2 would be deenergized or the commutators may cease rotation leaving the relays energized. In any case, the relays RE1 and RE2 will be deenergized when the contact rollers are retracted. Therefore if either trap has been set for ejection of a commutator, the descent of the commutator from the chute restores the trap to normal position for supporting a commutator upon the chute if the commutator tests good. A commutator which passes the short test will be retained by trap 215 and allowed to pass to trap 216, which will be tripped only in case the commutator fails to pass the ground test. If the commutator passes both tests, neither trap 215 nor trap 216 is tripped.

Lamp L1, connected with transformer secondary T3s, indicates that switch SW1 has been closed and that the apparatus is ready for the short test. Lamp L2 which is connected with wires 264 and 265 burns to indicate that switch SW2 has been closed and that solenoids S1 and S2 are ready to operate if relays RE1 and RE2 respectively are closed. Lamp L3 burns if thermal relay 260 opens and indicates that the motor M has stopped as result of excessive current in the primary of transformer T1 when "burning" off metal from the commutator the "burning" draws excessive current from the secondary of transformer T1.

Referring to Fig. 32, lines A—B—C—D—E—F show action of cams 125a and 125a' which control pins 138a and 138a' at the first and second stations respectively. Lines G—H—J—K—L—M show action of cams 125 and 125' which control pins 138 and 138' at the first and second stations respectively. At C—D pins 138a and 138a' are retracted to allow the commutators to roll down the chute away from the stations while the pins 138 and 138' are advanced to prevent descent of commutators above the stations. While between 85° and 115° (D—E) the pins 138a and 138a' are advancing, pins 138 and 138' are retracting between 95° to 115° (H—J) to permit commutators to roll into stations 1 and 2 respectively. At L, the pins 138 and 138' are advanced to separate the commutators at the stations 1 and 2 respectively from those commutators which are above the stations.

Lines N—O—P—Q—R represent the action of cams 90 and 90' which advance and retract shafts 76 and 76' respectively. At O to P these shafts are retracted. At Q (190°) to R (350°) the shafts are rotating the commutators.

Lines S—T—U—V—W represent the action of cams 158 and 158' in raising and lowering the rollers which engage the commutators while they rotate at stations 1 and 2. At T—U, the test rollers are up. At V (190°) to W (340°), the test rollers engage the commutators. They engage the commutators when the commutators begin to rotate and they leave the commutators just before the commutators cease rotation at the stations.

From the foregoing description, it is apparent that the commutator inspecting apparatus provides an inclined chute or track down which a commutator rolls past two stations. At station #1, the commutator is caused to stop and to be rotated axially while electric current is applied for burning off metal particles which might provide conducting paths between commutator bars, or between any bar and the commutator core. The voltage between rollers 185 and 186 is 25 volts, and the voltage between roller 185 and ground is 50 volts. The commutator is then released and rolls to station #2 where it is caused to stop and to be rotated axially while electric currents are applied thereto to detect shorts between bars not removed by "burning" and to detect a ground between a bar and the commutator core not removed by "burning." Traps forming parts of the chute are tripped respectively in response to detection of shorts and grounds for the purpose of causing the commutator to drop through the track into suitable bins after the commutator is permitted to descend from the second station. If the commutator is free of shorts and grounds, the traps are not tripped and the commutator rolls to the end of the chute and drops into a bin for receiving good commutators.

When the apparatus is used for testing commutators having riser bars, it is desirable to use a feeding station above the first or burn-out station.

Referring to Figs. 33–35, the upper end of the track bar 44 is spliced to an extension track bar 300 by means of a plate 301 secured by screws 302 and also by a splice bar 305 secured by screws 306 which pass through a spacer plate 304 and a bar 303 extending below the bar 305. Screws 307 attach to plate 303 a plate 308 to which a cylinder 310 is attached by screws 309. Cylinder 310 contains a piston having a rod 311 connected by a coupling 312 with a rod 313 which has a notch to provide a flat 314 and which is guided by a bracket 315 which screws 316 attach to the plate 301. Screws 317 attach to bracket 315 a plate 318 which is located close to the flat 314 thereby preventing rotation of the rod 313.

A pin 319 connects rod 313 with a bar 320 which screws 321 passing through slots 322 in bar 320 attach to a commutator release bar 323 adapted in its down position (Fig. 33) to extend between commutators represented by dot-dash circles C and having riser bars represented by dot-dash circles R. When the bar 323 is in the down position 323', the right commutator cannot gravitate down the track bars 341, but the left commutator is free to move. When fluid pressure is applied to the lower end of cylinder 310 to cause the rod 313 and the bar 323 to move up to release a commutator immediately to the right, it is necessary to provide a stop to prevent movement of the released commutator further than the position that the left commutator had occupied. For this purpose, a pin 324 attaches to the rod 313 a bar 325 having a hole therein through which a rod 326 extends and also through a hole in the track extension 300. The rod 326 is located in the desired vertical position by nuts 327 and 328 threaded on the rod and screwed against the bar 325. The cylinder 310 is controlled by a valve 330 which is spring actuated into the status of admitting pressure fluid to the lower end of the cylinder 310 while the upper end is connected with exhaust. When a solenoid 331 is energized the valve will be conditioned to admit pressure fluid to the upper end of the cylinder 310 while the lower end is connected with the exhaust. The solenoid 331 is controlled by a switch 332 which is operated by member 169 (Figs. 7 and 24), through a lever 335. When member 169 moves up after the "burning" operation at station I, the pin 138a is retracted to release the commutator which had been subjected to "burning" current, and pin 138 is advanced to prevent a commutator from descending to station I from a position above that pin. When member 169 moves up, lever 335 moves up to close switch 332 and the solenoid 331 is energized so that valve 330 is conditioned for causing pressure fluid to be admitted to the upper end of cylinder 310, whereupon the rod 326 and the bar 323 move down respectively from positions 326' and 323' so that a commutator will be released by the feeder shown in Fig. 33 while another commutator will be retained by this feeder. When bar 323 moves down, it separates the contiguous commutators so that their riser bars will become separated, and the gravitation of the lower commutator will not be interfered with by the upper commutator.

While the embodiment of the present invention as herein disclosed, constitutes a preferred form, it is to be understood that other forms might be adopted, all coming within the scope of the claims which follow.

What is claimed is as follows:

1. Apparatus for testing commutators having tubular, metal cores comprising an inclined chute down which the commutators roll, means for arresting movement of a commutator at a test station intermediate the ends of the chute and then for releasing the commutator after the test, a metallic, rotatable member for engaging the core of the commutator at the test station, means for advancing and retracting the rotatable member, a pair of contacts for engaging adjacent commutator bars, a third contact for engaging the commutator bars, means for advancing and retracting the contacts, mechanism for operating said means in recurrent sequence, two traps located below the test station and each normally permitting the commutator to pass down the chute and each movable to a position for effecting removal of the commutator from the chute, electromagnets respectively for operating said traps, a current source for said electromagnets, relay switches respectively for connecting the magnets with their current source, second and third current sources, a circuit including the second source, the coil of one of the relay switches and the pair of commutator engaging contacts, and a circuit including the third source, the coil of the other relay switch, the third commutator engaging contact and a ground circuit to the source through the commutator core and rotatable core engaging members, whereby the traps are moved respectively in response to short circuit between bars and ground of a bar on the commutator core.

2. A commutator testing apparatus comprising an inclined chute down which the commutators roll, two devices respectively for arresting movement of a commutator at a first or burn-out station and at a second or test station intermediate the ends of the chute and then for releasing the commutator, a rotating member at each station for engaging the commutator to rotate it, a device at each station for advancing and retracting the rotating member, pairs of contacts at each station for engaging adjacent commutator bars, a device at each station for advancing and retracting the contacts, mechanism for operating said devices in recurrent sequence, a current source connected with the pair of contacts engaging the commutator at the first station for "burning" metal particles lodged at the surface of the commutator between commutator bars, a second current source connected with the pair of contacts engaging the commutator at the second station, a trap below the second station normally permitting the commutator to pass down the chute and movable to a position for effecting removal of the commutator from the chute, and means responsive to flow of current from the second current source between adjacent bars for causing the trap to move into commutator removing position.

3. A commutator testing apparatus comprising an inclined chute down which the commutators roll, the commutators having metallic tubular cores insulatingly supporting commutator bars, a device for arresting movement of a commutator at a ground-test station, a metallic, rotating member at said station for frictionally engaging the interior surface of the commutator core to rotate the commutator, reciprocating means for advancing and retracting the member into and out of engagement with the commutator core, a current source connected with the member, a contact connected with the source and engageable with the commutator bars as they rotate, a trap below said station normally open for permitting the commutator to pass down the chute and movable to another position for effecting removal of the commutator from the chute, and electrically operated means responsive to flow of current from said source between a bar and the core of the commutator through said member for causing the trap to move into said another position for removing the commutator.

4. A commutator testing apparatus comprising an inclined chute down which the commutators roll, a test station, means at said station for arresting movement of the commutator, means for rotating the commutator while at the test station, a current source, a circuit for connecting the current source with parts of the commutator which, in a good commutator are electrically disconnected, said circuit including an electromagnet which is momentarily energized if commutator parts connected into said circuit during rotation of the commutator are electrically connected, said chute having a commutator discharge opening below the test station, two mechanically connectable movable elements, one for normally closing the opening and the other normally extending below the opening, and operating means rendered effective by momentary energization of the electromagnet for opening the first trap element to extend above the chute to block movement of the defective commutator whereby the second trap element receives the blocked commutator, the weight of the commutator causing the elements to return to normal position in consequence of which the commutator falls from the second element.

5. A commutator testing apparatus comprising an inclined chute down which the commutators roll, a test station, means at said station for arresting movement of the commutator, means for rotating the commutator while at the test station, a current source, a circuit for connecting the current source with parts of the commutator which, in a good commutator are electrically disconnected, said circuit including an electromagnet which is momentarily energized if commutator parts connected into said circuit during rotation of the commutator are electrically connected, a trap below the test station and comprising a pivoted lever having an arm normally located in position to close commutator discharge opening in the chute so that the commutator will normally pass down the chute, said lever having a second arm angularly displaced from the first arm, a spring connected with the lever and normally biased to hold the lever in normal position and biased by virtue of movement of the first lever arm a certain distance above the chute to cause the first arm to move further into commutator blocking position and the second arm to move into commutator receiving position and an armature moved in response to momentary energization of the electromagnet for moving the lever to locate the first arm said certain distance above the chute, the defective commutator moving against the first arm and engaging the second arm, the weight of the commutator effecting return of the lever to normal position in consequence of which the commutator falls from the second arm.

6. In a commutator testing device, the combination comprising an inclined chute down which commutators can roll, a device for feeding commutators singly from a supply at the upper end of the chute, a station at which a commutator stops during its passage down the chute, upper and lower commutator engaging pins adjacent said station and extendable alternately into the path of movement of the commutator, means for retracting the lower pin to release a commutator from the station while advancing the upper pin to retain a commutator before arrival at the station and vice versa, to advance the lower pin while retracting the upper pin, a member movable laterally of the commutator, a contact carried by the member into engagement with the commutator for the purpose of the function to be performed at the station, means for advancing and retracting the member, a mechanism for operating the pin moving means and the member moving means in timed relation so that the member is advanced toward the commutator when the lower pin is advanced and the upper pin is retracted and, vice versa, so that the member is retracted and the lower pin is retracted and the upper pin is advanced, and means responsive to retraction of the member for conditioning the feeding device for the release of a commutator from the supply at the upper end of the chute.

RUPERT C. WHELCHEL.

REFERENCES CITED

The following references are of record in the file of this patent:

UNITED STATES PATENTS

| Number | Name | Date |
|---|---|---|
| 939,109 | Switzer | Nov. 2, 1909 |
| 1,372,945 | Cullin | Mar. 29, 1921 |
| 1,656,887 | Goldsmith | Jan. 17, 1928 |
| 1,690,345 | Poole | Nov. 6, 1928 |
| 1,842,810 | Whelchel | Jan. 26, 1932 |
| 1,971,426 | Poole | Aug. 28, 1934 |
| 2,270,428 | Flint | Jan. 20, 1942 |
| 2,383,300 | Benson | Aug. 21, 1945 |
| 2,427,672 | Haydock | Sept. 23, 1947 |

FOREIGN PATENTS

| Number | Country | Date |
|---|---|---|
| 348,311 | Great Britain | May 14, 1931 |